United States Patent
Murphy et al.

(10) Patent No.: US 8,123,945 B2
(45) Date of Patent: Feb. 28, 2012

(54) METHOD FOR MAKING HIGH FLUX, HIGH SALT REJECTION CELLULOSE DESALTING MEMBRANES

(75) Inventors: Andrew Patrick Murphy, Littleton, CO (US); Saied Delagah, Denver, CO (US); Robert Lee Riley, La Jolla, CA (US)

(73) Assignees: The United States of America as represented by the Secretary of the Interior, The Bereau of Reclamation, Washington, DC (US); Separation Systems Technology Inc., San Diego, CA (US)

( * ) Notice: Subject to any disclaimer, the term of this patent is extended or adjusted under 35 U.S.C. 154(b) by 850 days.

(21) Appl. No.: 11/746,288

(22) Filed: May 9, 2007

(65) Prior Publication Data

US 2008/0277828 A1    Nov. 13, 2008

(51) Int. Cl.
  *B01D 11/00* (2006.01)
  *B01D 39/14* (2006.01)
  *B01D 71/16* (2006.01)
(52) U.S. Cl. ............. 210/634; 210/500.29; 210/500.3
(58) Field of Classification Search .............. 210/634, 210/643, 774, 766, 500.29, 500.3, 500.31, 210/500.32; 528/480, 491, 496, 499
See application file for complete search history.

(56) References Cited

U.S. PATENT DOCUMENTS

| | | |
|---|---|---|
| 4,147,622 A | 4/1979 | Nussbaumer |
| 4,234,528 A | 11/1980 | Nussbaumer et al. |
| 4,249,000 A | 2/1981 | Batzer et al. |
| 4,253,963 A | 3/1981 | Franken et al. |
| 4,305,823 A | 12/1981 | Batzer et al. |
| 4,631,157 A | 12/1986 | Johnson |
| 4,690,766 A | 9/1987 | Linder et al. |
| 4,720,345 A | 1/1988 | Linder et al. |
| 4,746,475 A | 5/1988 | Kohn |
| 4,855,048 A | 8/1989 | Tang |
| 4,894,165 A | 1/1990 | Fibiger et al. |
| 4,902,422 A | 2/1990 | Pinnau et al. |
| 4,909,943 A | 3/1990 | Fibiger et al. |

(Continued)

FOREIGN PATENT DOCUMENTS

GB    1430323    3/1976

(Continued)

OTHER PUBLICATIONS

Loske et al. Fractionation of cellulose acetate for the investigation of molecular weight influences on the morphology of membranes. Journal of Membrane Science. 214 (2003) 223-228.*

(Continued)

*Primary Examiner* — Vickie Kim
*Assistant Examiner* — Katherine Zalasky
(74) *Attorney, Agent, or Firm* — Stites & Harbison PLLC; Stephen J. Weyer

(57) ABSTRACT

A method is provided for producing a high flux, high salt rejection cellulose acetate desalination membrane. In this method, cellulose acetate polymer is dissolved in a first solvent such as methylene chloride or 2-methyltetrahydrofuran to produce a solution. Further steps involve stirring the solution, and thereafter permitting the solution to settle, for a time sufficient for a majority of the cellulose acetate to precipitate out of the solution to form a cellulose acetate precipitate. Next, the cellulose acetate precipitate is stirred into an excess methanol. Thereafter, the cellulose acetate is filtered out and used in making the desalination membrane.

25 Claims, 1 Drawing Sheet

U.S. PATENT DOCUMENTS

| | | | |
|---|---|---|---|
| 5,047,180 A * | 9/1991 | Steiner et al. ............... 264/5 |
| 5,158,636 A | 10/1992 | Groitzsch et al. |
| 5,185,429 A * | 2/1993 | Cinquina et al. ............. 528/503 |
| 5,482,634 A | 1/1996 | Goerlach-Doht et al. |
| 5,505,890 A | 4/1996 | Duweg et al. |
| 6,372,136 B1 | 4/2002 | Nakatsuka |
| 2003/0038081 A1 | 2/2003 | Wang et al. |
| 2004/0007529 A1 | 1/2004 | Blyankman et al. |

FOREIGN PATENT DOCUMENTS

| JP | 58214514 | 12/1983 |
|---|---|---|
| JP | 60106513 | 6/1985 |
| JP | 61-204011 | 9/1986 |
| JP | 62097612 | 5/1987 |
| JP | 5176346 | 7/1996 |
| JP | 2003-117552 | 4/2003 |

OTHER PUBLICATIONS

Camida. Penn Chemicals offers methyltetrahydrofuran—a good replacement solvent for dichloromethane. Dec. 2004, p. 5.*

The International Bureau of WIPO, Patent Cooperation Treaty, International Preliminary Report on Patentability, International Application No. PCT/US2008/052916, Nov. 10, 2009.

* cited by examiner

METHOD FOR MAKING HIGH FLUX, HIGH SALT REJECTION CELLULOSE DESALTING MEMBRANES

FIELD OF THE INVENTION

The present invention relates to desalting membranes used in water treatment systems, and, more particularly, to an improved method for making such membranes.

DESCRIPTION OF THE RELATED ART

Presently, desalination of water is achieved primarily through the use of membranes. The membranes of choice are made from two different polymer systems, viz., polyamide and cellulose acetate. Although polyamide based membranes are currently preferred in most desalting applications due to energy savings from lower pressure operation, the cellulose acetate membranes are in use in about 20% of the industry since they are a more robust membrane. The cellulose acetate membrane is naturally chlorine resistant and lower fouling, therefore, the cellulose acetate membrane could be more attractive if improvements are made on transport properties resulting in improved salt rejection and flux.

Typically, cellulose acetate membranes are prepared from large sheets of cellulose acetate. A casting solution is contacted in a large water bath wherein phase inversion occurs and the cellulose acetate precipitates out in sheets. A temperature annealing step, used on one side of the sheet, follows. The current methods of preparing cellulose acetate membranes, and specific problems with cellulose acetate membranes so prepared, are discussed in more detail below.

SUMMARY OF THE INVENTION

In accordance with the invention, an improved method is provided for making cellulose acetate polymers used in desalination membranes. The membranes produced by the method of the invention provide a number of other advantages over conventional cellulose acetate membranes. In this regard, the actual polymer from which the membrane is made is purified by an extraction technique involving solvents which separate out undesirable components from the polymer bulk. Some of these impurities may be seen in the form of "rods" (which are described in more detail below and which cause either salt to "leak" from the membrane thereby resulting in poor salt rejection or interfere with flux resulting in lower flux); these are removed from the polymer in the extracts and the bulk polymer remaining is used to make new cellulose acetate membranes which exhibit improved flux, salt rejection and mechanical strength.

According to one aspect of the invention, there is provided a method of producing high flux, high salt rejection cellulose acetate desalination membranes, the method comprising the steps of:

(a) mixing cellulose acetate polymer in a first solvent to produce a slurry;

(b) stirring the slurry, and thereafter permitting the slurry to settle for a time sufficient for a majority of the cellulose acetate to precipitate out of solution to form a cellulose acetate precipitate;

(c) decanting off the solvent containing impure components so as to leave the cellulose acetate precipitate behind;

(d) stirring the cellulose acetate precipitate into an excess of a further solvent;

(e) repeating steps (c) and (d) two to four times;

(f) adding the cellulose acetate slurry into a second solvent that results in solvent exchange of the first solvent for the second solvent;

(g) evaporating the solvent to leave cellulose acetate polymer;

(h) using the cellulose acetate polymer of step (g) to make casting solutions.

(i) filtering the casting solutions; and (j) using the filtered casting solutions to make a desalination membrane.

In one preferred embodiment, the first solvent comprises methylene chloride. In another embodiment, the first solvent comprises 2-methyltetrahydrofuran.

Advantageously, the further solvent comprises methanol.

Further features and advantages of the present invention will be set forth in, or apparent from, the detailed description of preferred embodiments thereof which follows.

DESCRIPTION OF THE PREFERRED EMBODIMENTS

Figure 1:
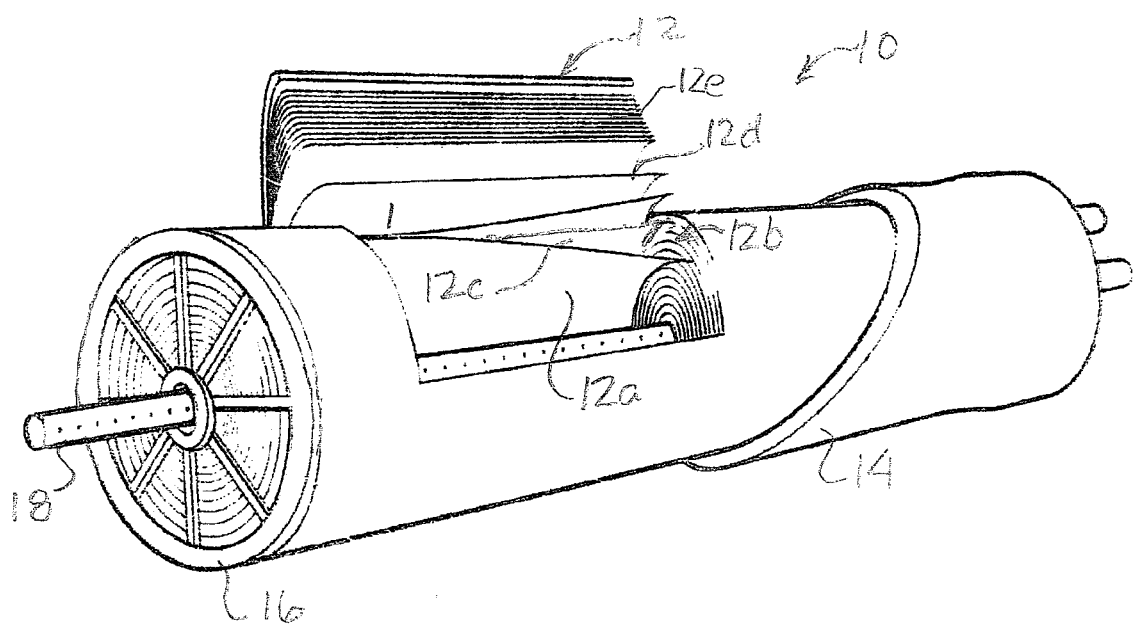
FIG. 1 is a perspective view of a desalination membrane unit.

Referring to FIG. 1, a spiral-wound reverse osmosis (RO) membrane unit 10 is shown which is typical of those currently used in desalting plants. The unit 10 includes a membrane element 12 which is constructed in accordance with the present invention. Because element 10 is conventional apart from membrane 12 (and, moreover, in this regard, the external physical appearance of membrane 12 would not be different for a conventional membrane), unit 10 will be only briefly described below by way of background. It will also be understood that membranes made by the methods of the present invention can be used in different membrane units than that shown in FIG. 1.

The unit 10 includes an outer pressure vessel 14 typically made of fiberglass with an antitelescoping device or shell 16 at opposite ends thereof. An axially extending product tube 18 is located centrally of element 10, as shown. The membrane element 12 itself includes a salt rejecting membrane surface 12a which forms part of a membrane leaf 12b including a tricot spacer 12c, a mesh spacer 12d and a membrane 12e. It will be appreciated that the membrane element 12 is the key component of unit 10 and defines the actual surface where salt is separated from water.

As briefly discussed above, in industry, large sheets of cellulose acetate are produced continuously for membranes. In the industrial method, the casting solution is contacted into a large bath of water wherein phase inversion occurs and the cellulose acetate polymer precipitates out in sheets. After this, a temperature annealing step is used on one side of the cellulose acetate sheet that, with the current method, produces a so-called "dense zone" that becomes the desalting barrier.

Figure 2:
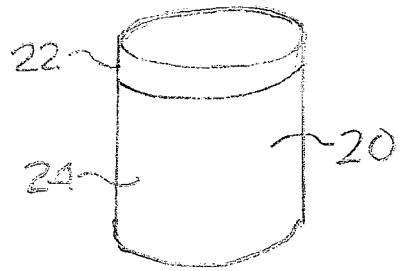
FIG. 2 is a highly schematic perspective view of a "rod" such as those found in commercial cellulose acetate membranes.

Referring to FIG. 2, there is shown, in a highly schematic manner, one of the rods, denoted 20, present throughout the polymer produced by the conventional industrial process described above. The dense zone of rod 10 is indicated at 22 while the remainder of the rod, which is referred to as a porous spongy zone, is denoted 24. Typically, the dense zone 22 is about $0.2\mu$ in depth (length) while the porous spongy zone 24 is about $75.0\mu$ long. The rods, e.g., rods corresponding to rod 20, cause interference in the transport properties (salt rejection and flux) in the dense zone (e.g., zone 22).

The removal of these impurities and rods provided by the method of the invention improves the transport properties of the resultant polymer, and because lower molecular weight cellulose acetate polymers are also removed, this results in improved mechanical strength throughout the polymer system. This increase in strength is significant because the thickness of the resultant membrane can be reduced, thereby providing more membrane surface per RO unit. These advantages of membranes produced by the method of the invention are discussed in more detail below.

In a preferred embodiment of the method of the invention, cellulose acetate polymer is partitioned in a solution of methylene chloride, followed by solvent exchange. When this is done, a small amount of the polymer (typically less than 10%) dissolves into the methylene chloride and the remainder is left behind. It will be understood that the non-dissolved polymer is the purified product, while the methylene chloride extract is rich in the undesirable components, rods, and lower molecular weight polymer.

It should be noted that these rods or rod-like imperfections on the membrane surface require special equipment and techniques to image, and because of this, there are few membrane specialists that even know such rod-like imperfections exist much less appreciate that the imperfections are present throughout the working membrane or "dense" zone, and are present as well in the remaining cellulose acetate polymer that provides the physical support for the relatively thin dense zones.

Example

In a specific non-limiting embodiment of the method of the invention, approximately 300 grams of cellulose acetate were mixed into a beaker containing methylene chloride. The mixture was stirred for about one hour. The beaker was covered to prevent solvent evaporation.

The next day, the contents of the beaker were inspected and it was observed that most of the cellulose acetate polymer remained as a loose precipitate on the bottom of the beaker. The solvent solution was then decanted off and replaced with more methylene chloride. The process set forth above was then repeated.

The overall process was repeated once more, making a total of three treatments with methylene chloride.

After the three treatments were completed, the remaining polymer was added to a large excess of methanol, with stirring. This solvent exchange process made it possible to filter the cellulose acetate on qualitative filter papers where the samples were allowed to dry. After drying, the samples were ready to be characterized. It is noted that the processed dried cellulose acetate can also be added to the casting solution(s).

A first characterization, which was carried out to determine whether rods were removed during the processing, involved casting a film on extremely flat silicon wafers. This was done using a laboratory apparatus designed to control the speed of wafer withdrawal from the polymer solution, and the rate of drying, and to maintain a clean environment to prevent particle contamination during film formation. The polymer solution was 2% in acetone and dry nitrogen gas was used to control the rate of drying. Atomic force microscopy (AFM) was used to characterize the film. Controls or the unprocessed polymer showed the presence of rods while, after processing the polymer as described above, the AFM showed considerable less rods.

A further characterization was used to determine whether there was any increase in the molecular weight (MW) of the processed polymer. In this characterization, samples of the processed and unprocessed polymer were characterized by gel permeation chromatography (GPC) and this produced the following results:

Commercial Diacetate:
$MW_w$=115,100
$MW_n$=78,600
Processed Diacetate:
$MW_w$=126,100
$MW_n$=93,400

These data show an increase in molecular weight of the processed polymer as compared with the commercial polymer. It is believed that this should result in an increase in the mechanical strength of the polymer which would be an important commercial improvement.

A further characterization concerned transport properties. In this characterization processed and unprocessed cellulose acetate were used to make membranes from casting solutions. The test conditions and test results are set forth, respectively, in the two tables below.

| Test Conditions | | |
|---|---|---|
| NaCl | 2000 | mg/L |
| Pressure | 425 | psi |
| Temp | 25 | ° C. |
| pH | 6.4 | |
| Flowrate | 1.8 | Gal/min |
| Sample size | 1 × 3" | |

| Cellulose Acetate Performance | | Experiment | | |
|---|---|---|---|---|
| Test Results | | 1 | 2 | 3 |
| Flux | Processed | 7.3 | 6.3 | 6.3 |
| | Commercial | 6.63 | 5.2 | 6 |
| % Salt Rejection | Processed | 96.55 | 94 | 95.3 |
| | Commercial | 93.17 | 93.9 | 90.4 |

It will be observed that the processed cellulose acetate exhibited higher flux and higher salt rejection. Further, it is anticipated that by maximizing extraction conditions salt rejection can be improved to greater than 99.5%.

Based on the molecular weight findings discussed above, it has been concluded that the processed cellulose diacetate (di-CA) will have a higher mechanical strength than the commercially available di-CA. The processed di-CA does not contain any rods since the rods are removed from the polymer, as described above, during the di-CA processing. These rods are decanted from the polymer during the processing. As indicated above, the processing produces two solutions, viz., the processed di-CA which is the end product, and the byproduct comprising a "rod" rich di-CA polymer decanted with the methylene chloride extract. As shown in the example above, the product (processed di-CA) has a higher molecular weight than the commercial di-CA. This indicates that lower molecular weight polymers were removed from the commercial di-CA, thereby resulting in increase in the molecular weight of the processed di-CA. Therefore, it can be assumed that the "rod" rich solution byproduct contains the lower molecular weight polymers.

In general, if linear polymers with lower molecular weights could be removed from bulk, this would increase the overall molecular weight and mechanical strength of the polymer, and the byproduct or "rod" rich di-CA extract should have lower molecular weight and mechanical strength. It might be thought that these "rod-like" impurities may add some unexpected strength, similar to the strength added by fiberglass plastic resins in creating the commercially valuable FRP or fiberglass reinforced plastic. However, test results, discussed below, do not support this.

In order to demonstrate the lower mechanical strength of the "rod" rich di-CA, films were made with the "rod" rich methylene chloride extract. The polymer from approximately 500 mL of the extract was dissolved in acetone, and thin films were cast and used to determine tensile strength. The table below, which concerns tensile strength at break, measured in MPa (wherein MPa equals 1 $N/mm^2$) of commercial CA versus the "rod" rich cellulose diacetate with lower molecular weight and tensile strength, shows the results.

| Cellulose diacetate (Commercial) | "Rod" Rich Cellulose diacetate ($MeCl_2$ Extract) |
|---|---|
| 32-56 | 0.58-0.59 |

These data demonstrate that the lower molecular weight "rod" rich di-CA has a much, much lower tensile strength than the commercial di-CA, thus suggesting that the removal of the "rod" rich di-CA polymers using methylene chloride as described above would yield a polymer with superior strength. Therefore, in the absence of actual tensile strength test data, it can at least be inferred that the membrane made from the processed cellulose diacetate (di-CA) polymer would be of superior strength as compared with the current commercial product.

It will be appreciated that the method of the present invention is not limited to the examples described above. It is noted, for example, that other solvents could be substituted for methylene chloride. One such solvent is 5-methylfuran. It is also noted that non-chlorinated solvents are usually preferred for environmental reasons.

Although the invention has been described above in relation to preferred embodiments thereof, it will be understood by those skilled in the art that variations and modifications can be effected in these preferred embodiments without departing from the scope and spirit of the invention.

What is claimed:

1. A method of producing a cellulose acetate polymer for high flux, high salt rejection cellulose acetate desalination membranes by removing rod-like impurities, said method comprising the steps of:
   (a) mixing cellulose acetate polymer in a first solvent to produce a slurry in a vessel;
   (b) stirring the slurry, and thereafter permitting the slurry to settle for a time sufficient for a majority of the cellulose acetate to precipitate out of solution to form a cellulose acetate precipitate in the vessel;
   (c) decanting off and discarding the solvent containing impure components so as to leave the cellulose acetate precipitate behind in the vessel;
   (d) stirring the cellulose acetate precipitate into an excess of a further solvent;
   (e) repeating steps (c) and (d) two to four times;
   (f) adding the cellulose acetate slurry into a second solvent that results in solvent exchange of the first solvent for the second solvent; and
   (g) evaporating the second solvent to leave cellulose acetate polymer.

2. A method as claimed in claim 1 further comprising a further step (k) of decanting off the solution, adding more of the first solvent and repeating step (a) to precipitate out more of the cellulose acetate.

3. A method as claimed in claim 2 wherein step (k) is repeated from 1 to 25 times.

4. A method as claimed in claim 1 wherein the first solvent comprises methylene chloride.

5. A method as claimed in claim 1 wherein the first solvent comprises 2-methyltetrahydrofuran.

6. A method as claimed in claim 4 wherein the further solvent comprises methanol.

7. A method as claimed in claim 5 wherein the further solvent comprises methanol.

8. A method of producing a cellulose acetate polymer for high flux, high salt rejection cellulose acetate desalination membranes by removing rod-like impurities, said method comprising the steps of:
   (a) dissolving cellulose acetate polymer in a first solvent to produce a solution in a vessel;
   (b) stirring the solution, and thereafter permitting the solution to settle for a settling time sufficient for a majority of the cellulose acetate to precipitate out of the solution to form a cellulose acetate precipitate in the vessel;
   (c) stirring the cellulose acetate precipitate into an excess of methanol to effect a solvent exchange that results in solvent exchange of methanol for the first solution;
   (d) after step (b) or (c), decanting off and discarding the solution or the methanol from the vessel, adding more of the first solvent or methanol to the vessel and repeating step (b) or (c) to precipitate more of the cellulose acetate in the vessel; and
   (e) evaporating the methanol from the vessel to leave cellulose acetate polymer in the vessel.

9. A method as claimed in claim 8 wherein the dissolving step (a) comprises heating the first solvent.

10. A method as claimed in claim 9 wherein a heating temperature of between 0 and 100° C. is used.

11. A method as claimed in claim 8 wherein the step (b) of stirring the solution takes place at a stir rate between 10 to 10,000 rpm and the settling time is between 1 minute to 15 days.

12. A method as claimed in claim 8 wherein the step (c) of stirring the cellulose acetate precipitate takes place at a stir rate between 10 to 10,000 rpm and the settling time is between 1 minute to 15 days.

13. A method as claimed in claim 8 wherein step (f) is repeated for 1 to 25 times.

14. A method as claimed in claim 8 wherein the first solvent comprises methylene chloride.

15. A method as claimed in claim 8 wherein the first solvent comprises a solvent of a similar polarity to that of methylene chloride.

16. A method as claimed in claim 15 wherein the first solvent comprises one of acetone, ethanol, dioxane, and 2-butanone.

17. A method as claimed in claim 8 wherein the first solvent comprises 2-methyltetrahydrofuran.

18. A method as claimed in claim 8 wherein the first solvent comprises a solvent of a similar polarity to 2-methyltetrahydrofuran.

19. A method as claimed in claim 18 wherein the first solvent comprises one of isopropanol, n-butanol, tetrahydrofuran, and n-propanol.

20. A method of producing a cellulose acetate polymer for high flux, high salt rejection cellulose acetate desalination membranes by removing rod-like impurities, the method comprising the steps of:
  (a) mixing cellulose acetate polymer in a first solvent to produce a slurry in a vessel;
  (b) stirring the slurry, and thereafter permitting the slurry to settle, for a time sufficient for a majority of the cellulose acetate to precipitate out of the solution to form a cellulose acetate precipitate in the vessel;
  (c) decanting off and discarding the solvent containing impure components so as to leave the cellulose acetate precipitate behind in the vessel;
  (d) stirring the cellulose acetate precipitate of the vessel into an excess of a further solvent;
  (e) repeating steps (c) and (d) two to four times;
  (f) adding the cellulose acetate slurry into a second solvent that results in solvent exchange of the first solvent for the second solvent;
  (g) decanting off and discarding the second solvent containing impure components so as to leave the cellulose acetate polymer behind;
  (h) stirring the cellulose acetate precipitate into an excess of another solvent
  (i) repeating steps (g) and (h) two to four times; and
  (j) evaporating the solvent to leave cellulose acetate polymer.

21. The method of claim 8, further comprising:
  (f) using the cellulose acetate polymer produced by step (d) in making a desalination membrane.

22. The method of claim 8, further comprising adding a second solvent to the cellulose acetate polymer of step (d).

23. The method of claim 8, wherein, in step (d), the solution removed from the vessel contains rod-like impurities.

24. The method of claim 1, further comprising:
  (h) using the cellulose acetate polymer of step (g) to make casting solutions;
  (i) filtering the casting solutions; and
  using the filtered casting solutions to make a desalination membrane.

25. The method of claim 20, further comprising:
  (k) using the cellulose acetate polymer of step (j) to make casting solutions;
  (l) filtering the casting solutions; and
  (m) using the filtered casting solutions to make a desalination membrane.

* * * * *